(12) United States Patent
Hsieh

(10) Patent No.: US 6,811,347 B1
(45) Date of Patent: Nov. 2, 2004

(54) LAMP POST INSERTIONAL CONJOINMENT STRUCTURE

(76) Inventor: Pi-Hua Hsieh, No. 18, Ping-Ho 10 Street, Lun-Ping Li, Changhun city (TW)

( * ) Notice: Subject to any disclaimer, the term of this patent is extended or adjusted under 35 U.S.C. 154(b) by 0 days.

(21) Appl. No.: 10/693,900

(22) Filed: Oct. 28, 2003

(51) Int. Cl.$^7$ ............................................... E04D 13/04
(52) U.S. Cl. ....................................... 403/300; 403/307
(58) Field of Search ................................ 403/300–305, 403/307, 314

(56) References Cited

U.S. PATENT DOCUMENTS

| | | | | |
|---|---|---|---|---|
| 4,441,837 A | * | 4/1984 | Mastroni | .................... 403/300 |
| 5,967,691 A | * | 10/1999 | Lancelot, III | ............... 403/313 |
| 6,330,724 B1 | * | 12/2001 | Belle | ............................. 4/288 |

* cited by examiner

Primary Examiner—John R. Cottingham
(74) Attorney, Agent, or Firm—Dennison, Schultz, Dougherty & MacDonald

(57) ABSTRACT

An improved lamp post insertional conjoinment structure consisting of a locking connector component ensleeved between an upper and a lower lamp post, with the locking connector component comprised of a threaded rod having a neck section at its leading and trailing extremities, a sleeve coupling in which the threaded rod is installed through the center, and a prong ring fastened onto the upper and lower extremities of the threaded rod and positioned at each of the two sides of the sleeve coupling. The prong ring has spring elements that extend from its circumferential edge, each spring element also having an indented pawl section and, furthermore, the pawl sections engage the threaded rod neck sections such that when the free extremities at the end sections of the spring elements turn as the prong rings rotate, they are propped open at a suitable rate and firmly postured against the interior circular walls of the lamp posts. As such, assembly is simple and DIY user assembly is facilitated; furthermore, since each steel post can also be disassembled, they can be taken apart to effectively reduce overall shipping dimensions.

6 Claims, 6 Drawing Sheets

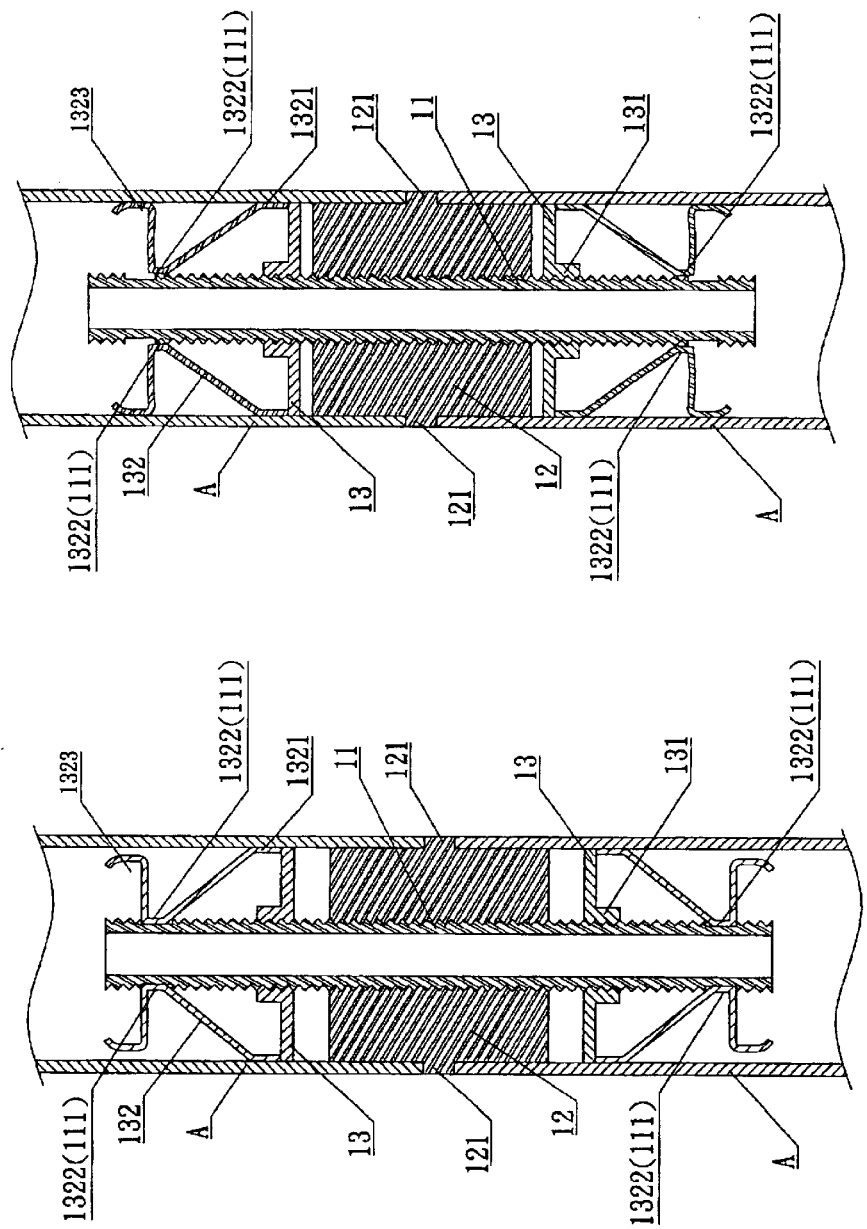

LAMP POST INSERTIONAL CONJOINMENT STRUCTURE

BACKGROUND OF THE INVENTION

1) Field of the Invention

The invention herein relates to lighting products, specifically an improved lamp post insertional conjoinment structure in which the locking connector component prong ring has spring elements that extend from its circumferential edge, each said spring element also having an indented pawl section and, furthermore, the pawl sections engage the threaded rod neck sections such that when the free extremities at the end sections of the spring elements turn as the prong rings rotate, they are propped open at a suitable rate and firmly postured against the interior circular walls of the lamp posts. As such, assembly is simple and DIY user assembly is facilitated; furthermore, since each steel post can also be disassembled, they can be taken apart to effectively reduce overall shipping dimensions.

2) Description of the Prior Art

In conventional lamp post insertional conjoinment structures, after the inner and outer lamp posts are connected, the connected section is fastened with bolts to keep the two posts conjoined. However, this conjoinment method requires the forming of stepped edges on the posts (due to differing pipe dimensions), resulting in the shortcoming of unattractive tubular members. In view of this, the applicant of the invention herein conducted extensive research along with repeated testing and refinement that cultimninated in the sucessful development of the improved lamp post insertional conjoinment structure of the present invention.

SUMMARY OF THE INVENTION

The objective of the invention herein is to provide an improved lamp post insertional conjoinment structure consisting of a locking connector component ensleeved between an upper and a lower lamp post, with the said locking connector component comprised of a threaded rod having a neck section at its leading and trailing extremities, a sleeve coupling in which the threaded rod is installed through the center, and a prong ring fastened onto the upper and lower extremities of the threaded rod and positioned at each of the two sides of the sleeve coupling; the said prong ring has spring elements that extend from its circumferential edge, each said spring element also having an indented pawl section and, furthermore, the pawl sections engage the threaded rod neck sections such that when the free extremities at the end sections of the spring elements turn as the prong rings rotate, they are propped open at a suitable rate and firmly postured against the interior circular walls of the lamp posts; as such, assembly is simple and DIY user assembly is facilitated; furthermore, since each steel post can also be disassembled, they can be taken apart to effectively reduce overall shipping dimensions.

To provide the examination committee a further understanding of the structure, features, functions, and other practical objectives of the present invention, the brief description of the drawings below are followed by the detailed description of the invention herein.

BRIEF DESCRIPTION OF THE DRAWINGS

FIG. 3 is a cross-sectional drawing of the lamp post and the sleeve coupling before tightening.

FIG. 4 is a cross-sectional drawing of the lamp post and the sleeve coupling after tightening.

FIG. 5-A is a cross-sectional drawing of the said embodiment.

DETAILED DESCRIPTION OF THE INVENTION

Figure 1:
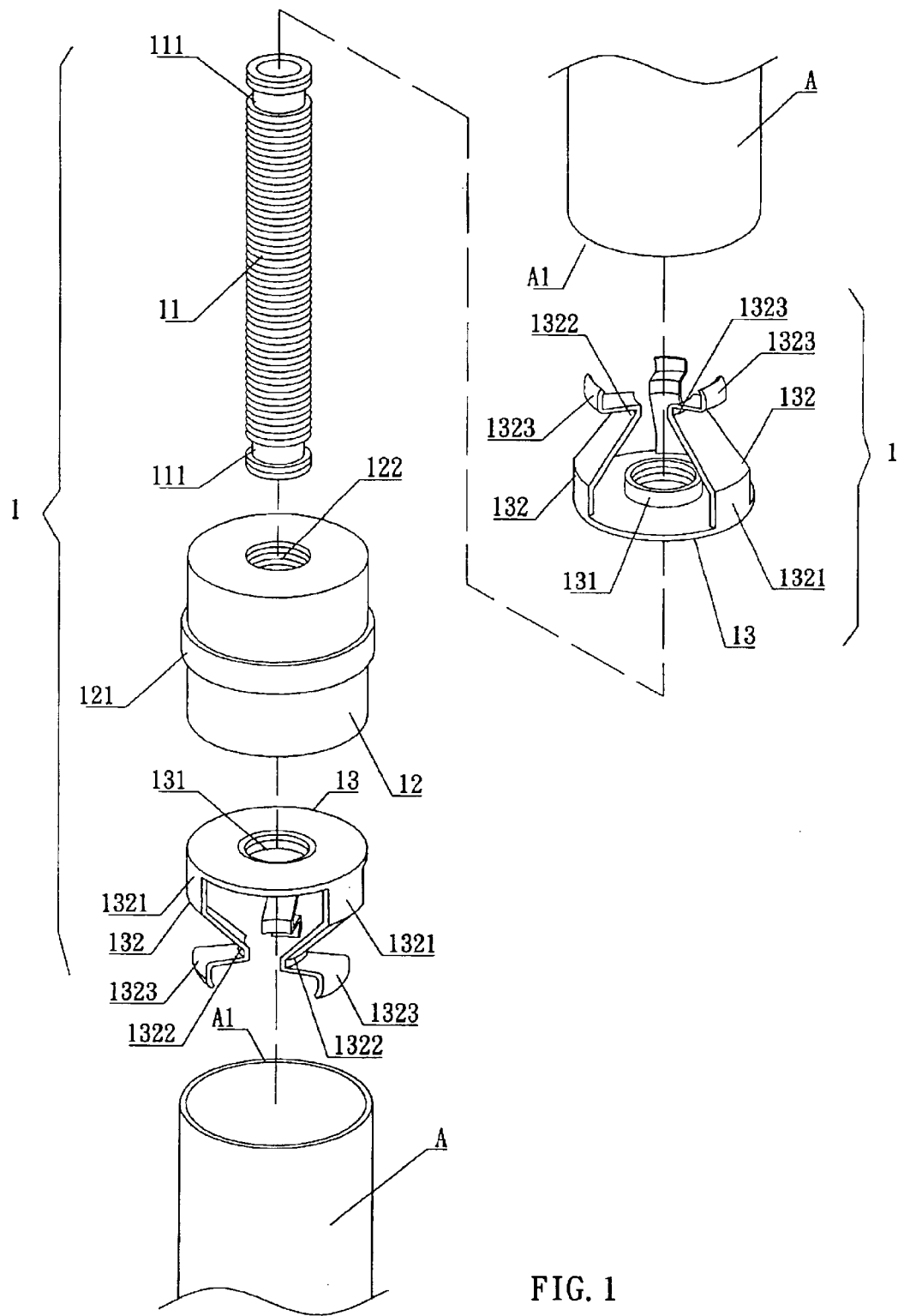
FIG. 1 is an exploded drawing of the invention herein.
Figure 2:
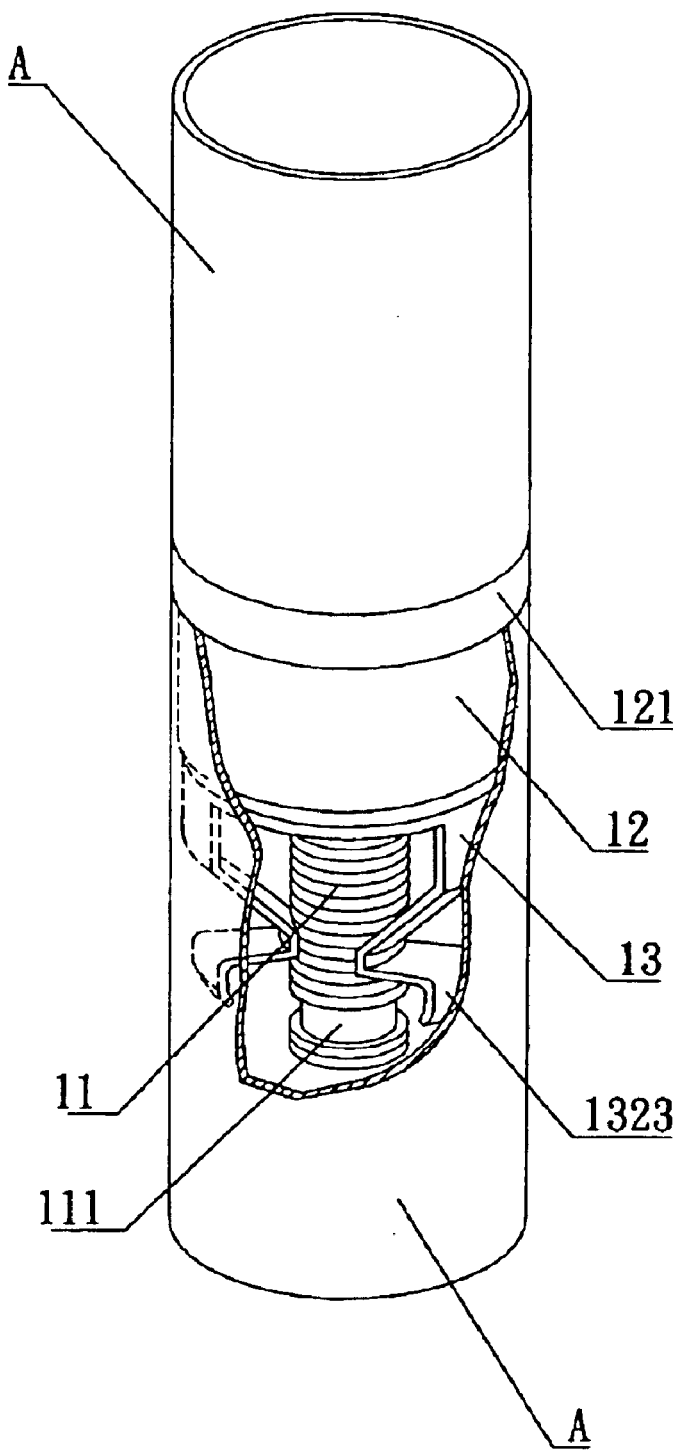
FIG. 2 is an isometric drawing of the invention herien.

Referring to FIG. 1 and FIG. 2, the structural arrangement of the invention herein, the invention herein consists of a locking connector component 1 ensleeved between an upper and a lower lamp post A, with the said locking connector component 1 comprised of a threaded rod 11, a sleeve coupling 12 in which the threaded rod 11 is installed through the center, and a prong ring 13 fastened onto the upper and lower extremities of the threaded rod 11 and positioned at each of the two sides of the sleeve coupling 12.

The said threaded rod 11 has a neck section 111 recessed inward at its leading and trailing extremities that provides for the detent positioning of the prong ring 13 and only enables the prong ring 13 to move in a single direction.

The said sleeve coupling 12 has a central stop annulation 121 protruding along the medial section of its circumferential surface that provides for the post-insertion topping out of the upper and lower lamp post A sleeving ends A1; the sleeve coupling 12 also has a threaded hole 122 formed through its center that provides for the fastening of the threaded rod 11.

The said prong ring 13 has a lock section 131 extending from its center for fastening the threaded rod 11, the prong ring 13 also has spring elements 132 that each extend from its circumferential edge, the circumferential edge portion of each said spring element 132 having a perpendicular section 1321 of appropriate length that provides for the slightly tight ensleeving of the lamp posts A, each said spring element 132 also having a pawl section 1322 indented at a suitable location and, furthermore, the pawl section 1322 engages the threaded rod 11 neck section 111 such that the prong ring 13 cannot fall downward, and when the free extremities 1323 at the end sections of the spring elements 132 turn as the prong rings 13 rotate, they are propped open at a suitable rate and firmly postured against the interior circular walls of the lamp posts A.

As for the operating method, referring to FIG. 3 and FIG. 4, after the threaded rod 11 is insertionally fastened through the sleeve coupling 12, a prong ring 13 is fastened onto the threaded rod 11 at each of the two sides of the sleeve coupling 12, enabling the prong ring 13 pawl sections 1322 to engage the threaded rod 11 neck sections 111 and the outer sides of each prong ring 13 to fit at a slight tightness into a lamp post A such that the lamp post A is capable of causing the synchronous rotation of the prong ring 13 (as shown in FIG. 3); as such, when the lamp posts A rotate the prong rings 13 on the threaded rod 11, the prong ring 13 spring elements 132 are released upward from the neck sections 111, and after the spring 132 pawl sections 1322 and neck sections 111 separate, the pawl sections 1322 are propped open by the outer diameter of the threaded rod 11 and expanded outward forcefully against the interior circular walls of the lamp posts A, thereby tightly fixing the lamp posts A to the sleeve coupling 12 (as shown in FIG. 4); as such, assembly is simple and DIY user assembly is facilitated; furthermore, since each steel post can also be disassembled, they can be taken apart to effectively reduce overall shipping dimensions.

Figure 5:
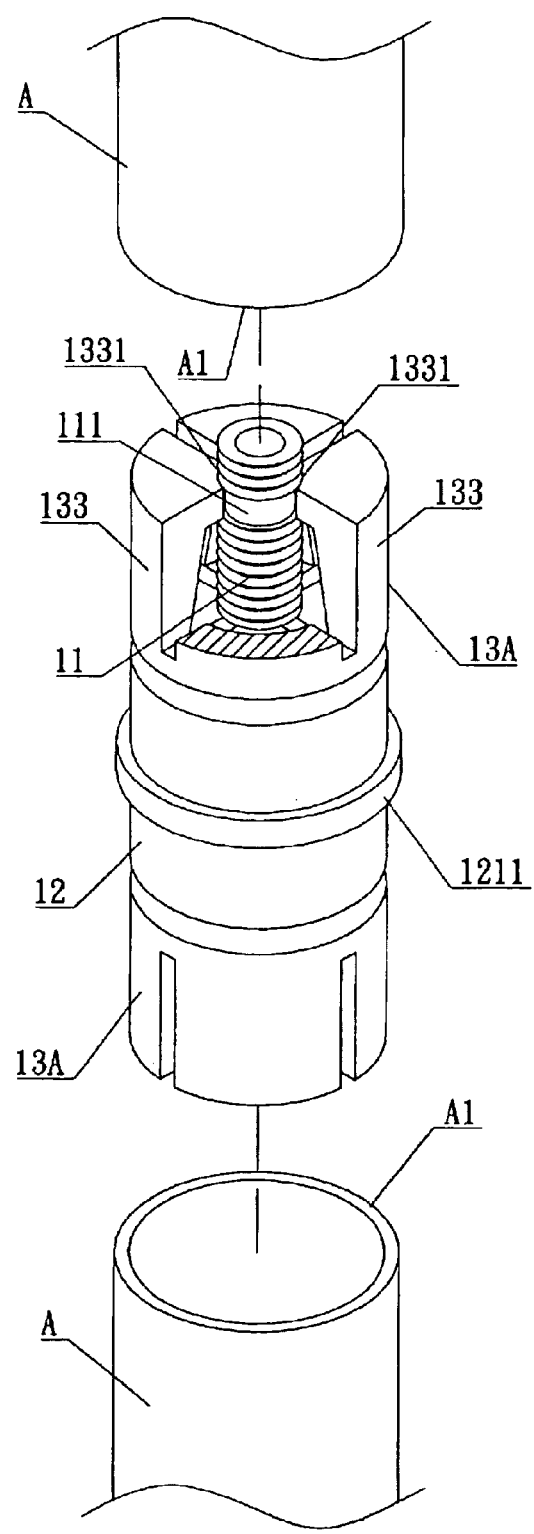
FIG. 5 is an isometric drawing of another embodiment of the invention herein.
Figure 5A:
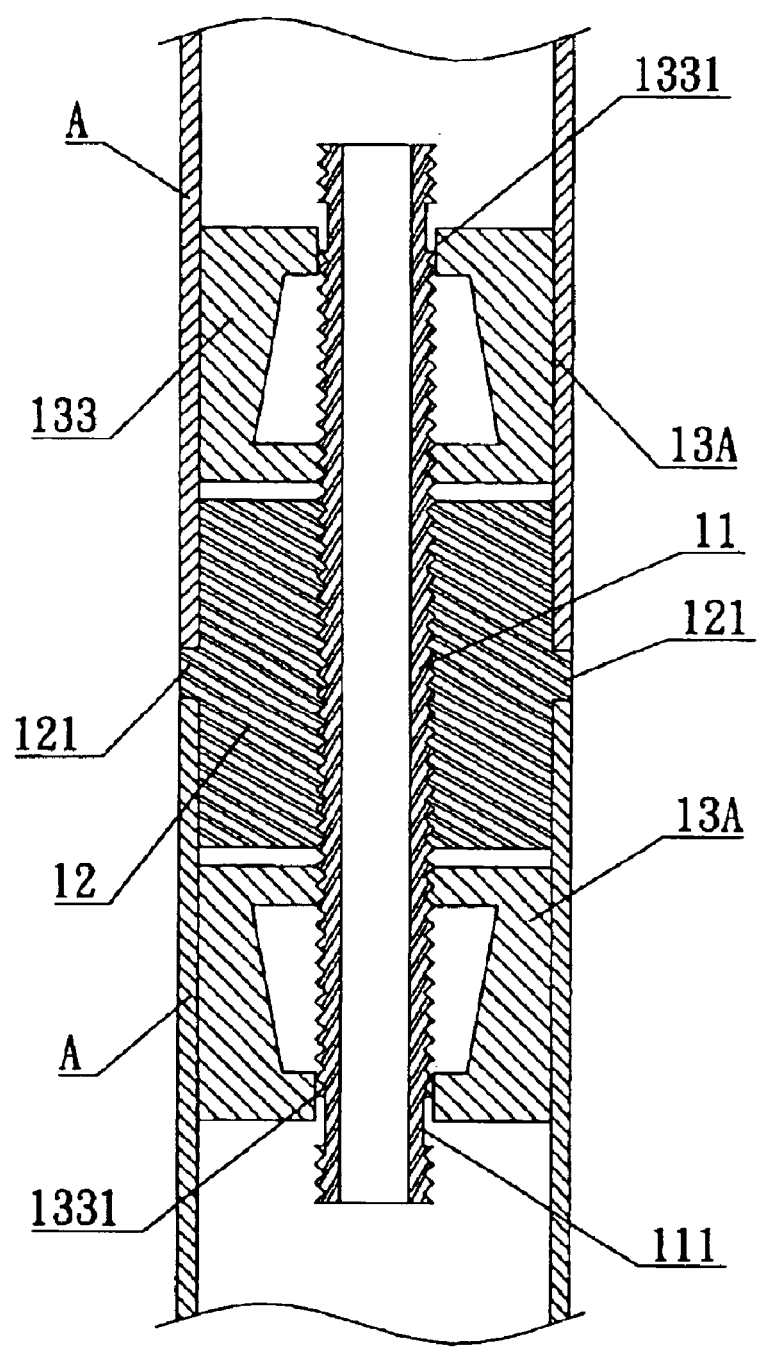

Referring to FIG. 5 and FIG. 5-A, the said prong ring 13A is of plastic construction, and the structural arrangement of the circumferential edge includes anchoring claws 133 and, furthermore, hook sections 1331 at the ends of the anchoring claws 133 that are detent situated in the threaded rod 11 neck sections 111; when the lamp post A rotates the prong rings 13A on the threaded rod 11, the prong ring 13A anchoring claws 133 are released from the threaded rod 11 neck sections 111 and after the anchoring claw 133 hook sections 1331 and neck sections 111 separate, the hook sections 1331 are propped open by the outer diameter of the threaded rod 11 and expanded outward forcefully against the interior circular walls of the lamp posts A, thereby tightly fixing the lamp posts A to the sleeve coupling 12.

Figure 6:
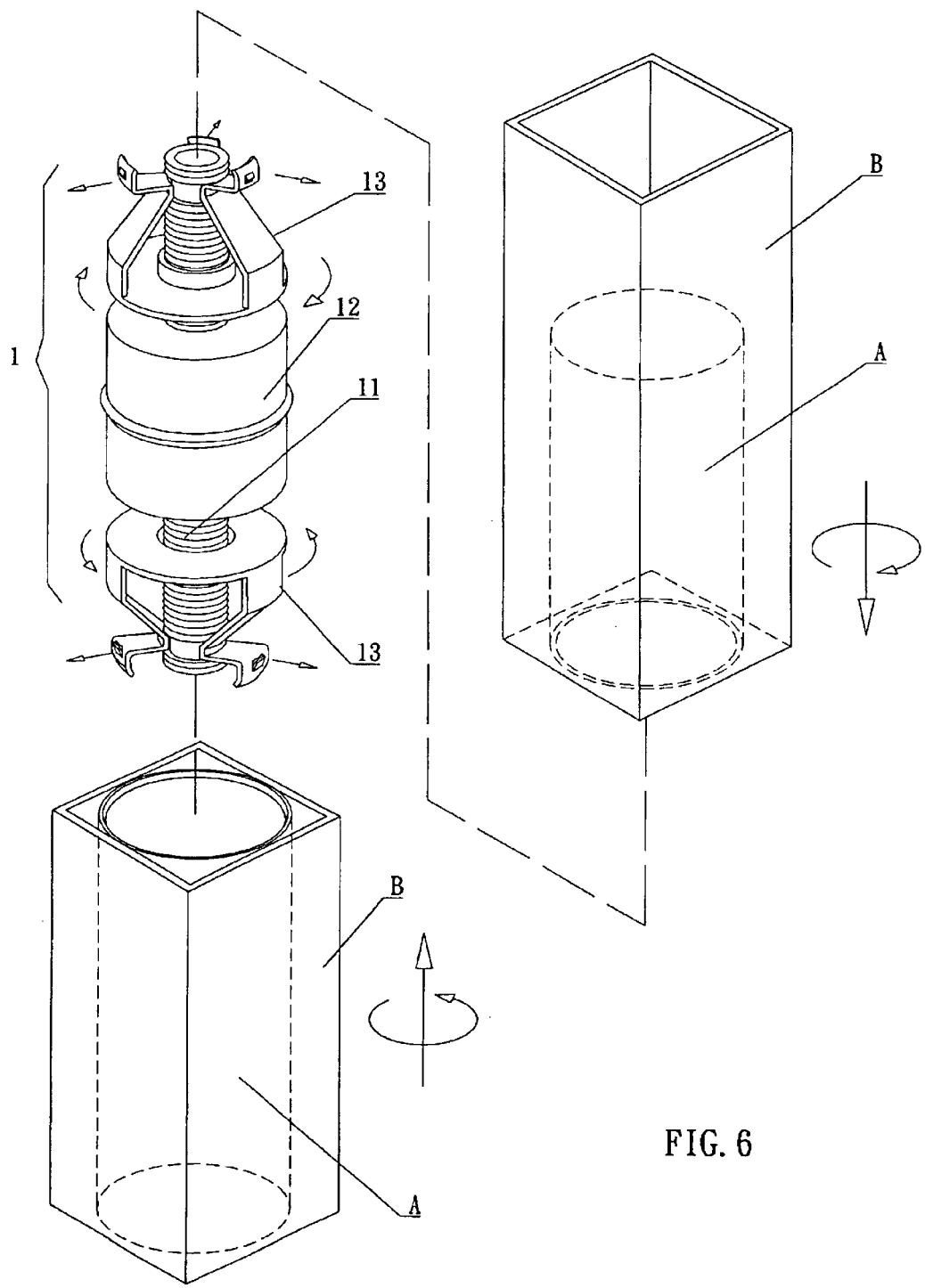
FIG. 6 is an isometric drawing of the invention herein enhanced by the exterior tube.

Referring to FIG. 6, the said lamp posts A can be equipped with an identically or differently shaped exterior tube B that is installed around their exteriors to provide for varations in lamp post structure.

What is claimed is:

1. An improved lamp post insertional conjoinment structure consisting of a locking connector component ensleeved between an upper and a lower lamp post, with the said locking connector component comprised of a threaded rod, a sleeve coupling in which the said threaded rod is installed through the center, and a prong ring fastened onto the upper and lower extremities of the said threaded rod and positioned at each of the two sides of the said sleeve coupling;

the said threaded rod has a neck section recessed inward at its leading and trailing extremities that provides for the detent positioning of the said prong ring and only enables the said prong ring to move in a single direction;

the said prong ring has spring elements that extend from its circumferential edge and, furthermore, each said spring element also having an indented pawl section and, furthermore, the said pawl sections engage the said threaded rod neck sections such that when the free extremities at the end sections of the said spring elements turn as the said prong rings rotate, they are propped open at a suitable rate and firmly postured against the interior circular walls of the said lamp posts.

2. An improved lamp post insertional conjoinment structure as claimed in claim 1 in which the said sleeve coupling has a central stop annulation protruding along the medial section of its circumferential surface that provides for the post-insertion topping out of the said upper and lower lamp post at their sleeving ends.

3. An improved lamp post insertional conjoinment structure as claimed in claim 1 in which the said prong ring has a lock section extending from its center for fastening the said threaded rod.

4. An improved lamp post insertional conjoinment structure as claimed in claim 1 in which the said prong ring spring element has a perpendicular section of appropriate length that provides for the slightly tight ensleeving of the said lamp posts.

5. An improved lamp post insertional conjoinment structure as claimed in claim 1 in which the said prong ring is of plastic construction, and the structural arrangement of the circumferential edge includes anchoring claws and, furthermore, hook sections at the ends of the said anchoring claws that are detent situated in the said threaded rod neck sections; when the said lamp posts rotate the said prong rings on the said threaded rod, the said prong ring anchoring claws are released from the said threaded rod neck sections, and after the said anchoring claw hook sections and said neck sections separate, the said hook sections are propped open by the outer diameter of the said threaded rod and expanded outward forcefully against the interior circular walls of the said lamp posts.

6. An improved lamp post insertional conjoinment structure as claimed in claim 1 in which the said lamp posts can be equipped with an identically or differently shaped exterior tube that is installed around their exteriors to provide for varations in lamp post structure.

* * * * *